E. A. RADUNZ & O. ENGELHARDT.
SAFETY VALVE FOR GAS LINES.
APPLICATION FILED SEPT. 5, 1911.
1,035,467.
Patented Aug. 13, 1912.
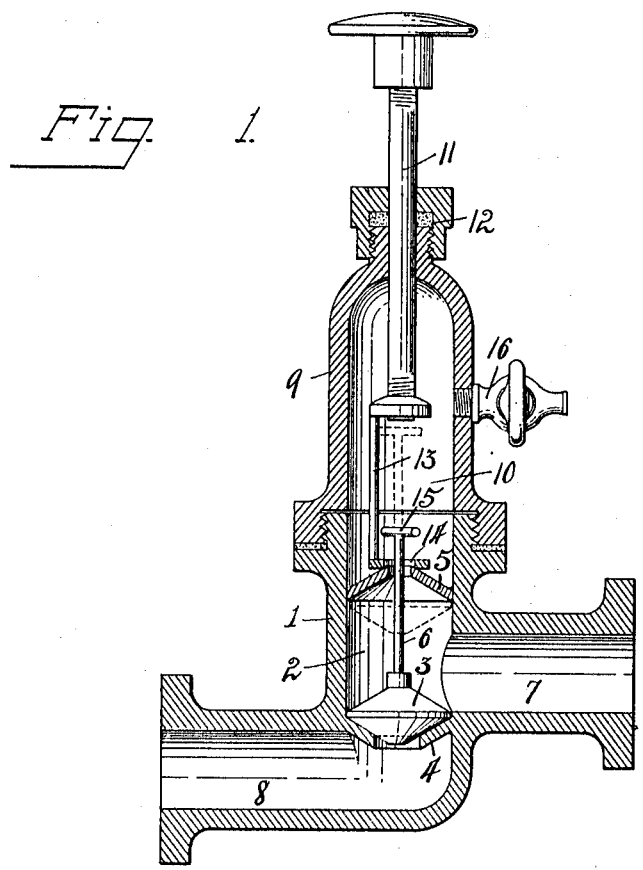
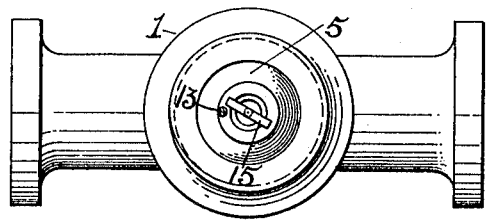
WITNESSES:
INVENTORS.

UNITED STATES PATENT OFFICE.

EMIL A. RADUNZ AND OTTO ENGELHARDT, OF TOLEDO, OHIO.

SAFETY-VALVE FOR GAS-LINES.

1,035,467.

Specification of Letters Patent. Patented Aug. 13, 1912.

Application filed September 5, 1911. Serial No. 647,627.

*To all whom it may concern:*

Be it known that we, EMIL A. RADUNZ and OTTO ENGELHARDT, citizens of the United States, and residents of Toledo, in the county of Lucas and State of Ohio, have invented a certain new and useful Safety-Valve for Gas-Lines; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to check valves, and particularly to valves of this character adapted for use in gas lines and automatically operable to close the line upon a shutting off of the pressure therein and to maintain the line closed until the valve is manually operated to open the same.

The object of our invention is the provision of an efficient valve of this character, which is simple and inexpensive in its construction, and adapted to be held in either open or closed position by gas or other fluid pressure within the line, and to automatically move to close the line upon a shutting-off of the pressure therein.

The invention is fully described in the following specification, and while, in its broader aspect, it is capable of embodiment in numerous forms, a preferred embodiment thereof is illustrated in the accompanying drawings, in which,—

Figure 1 is a central vertical section of a device embodying the invention, and Fig. 2 is a top plan view thereof with the top cap portion removed and a portion of the valve lifting rod in section.

Referring to the drawings, 1 designates a valve casing having a vertically disposed valve chamber 2 therein in which a valve 3 works. The valve 3 is preferably of double conical form, but may be of any other suitable form if desired, and is adapted to seat by gravity upon an annular conical seat 4 at the bottom of the valve chamber, and when raised within such chamber to seat at the upper end thereof against an upwardly dished conical seat 5 having an opening through the apex thereof for the valve stem 6 to freely project through, as indicated. It will, of course, be understood that the shapes of the valve seats 4 and 5 are made to conform to the shapes of the portions of the valve which seat thereagainst and that if a valve of other form than that shown is used the shape of the seats will be changed accordingly.

The inlet passage to the valve chamber 2 is designated at 7 and opens into a side thereof preferably immediately above the valve seat 4, while the outlet passage from such chamber is through the central opening in the seat 4 and a passage 8 in communication therewith, as indicated, said passages 7 and 8 being preferably provided in nipples projecting from the valve casing 1 to facilitate the interposing of the casing in a gas or other fluid pressure line. The arrangement of the inlet passage 7 relative to the valve seats 4 and 5 is such that pressure within the line will be exerted upon the under side of the valve, when in open position and seated against the upper valve seat 5, to maintain it in such position, while pressure within the passage 7, when the valve is in closed position or resting upon the seat 4, will act upon the upper side of the valve to maintain it closed.

The upper end of the valve chamber 2 has a cap 9 threaded or otherwise suitably secured thereto and forming a chamber 10 which is in communication through the opening in the valve seat 5 with the valve chamber 2. A valve lifting rod 11 is projected into the cap through a stuffing box 12 at the upper end thereof and has its lower end provided with a finger or part 13 the lower end of which is laterally angled and provided with an opening 14 through which the stem 6 of the valve loosely projects, as indicated. The angled end of the lifting-rod finger 13 is adapted, in the present instance, to seat upon the upper side of the valve seat 5 when the rod 11 is lowered in inoperative position. Upon a raising of the rod 11 the angled lower end thereof moves into engagement with a head or enlargement 15 on the upper end of the valve stem and coacts therewith to raise the valve stem and valve to effect a seating of the latter against the seat 5. The valve having been raised in this manner to open position, the gas or other fluid pressure within the line will act upon the under side thereof to retain it in the raised or open position indicated by dotted lines in Fig. 1. Upon a raising of the valve into contact with the valve seat 5, the rod 11 is lowered to its normal position as indicated in the drawing, thus leaving the valve free to drop by gravity upon a shutting off of the pressure within the line. Upon a turning on of the pressure within the line after a seating of the valve, such pressure will act to maintain the valve seated until it is again raised by an upward movement of the rod 11.

16 designates a relief cock, which is tapped into the cap 9 and intended to be opened to relieve the pressure which may be occasioned within the cap chamber 10 upon a raising of the valve 3 to its seat 5, thus preventing the pressure, which might be generated within the chamber 10 by the compressing action of the valve 3 when raised, from combining with the gravity action of the valve to overcome the valve sustaining pressure within the line. When the valve has been raised to full open position the relief cock 16 is closed and the valve lifting rod 11 then lowered to inoperative position.

It is apparent that we have provided a simple, efficient and easily operated safety valve which may be used in gas lines within buildings or in other places where it is important to the preservation of life to close the gas line should the pressure therein be shut off or so reduced that the fires fed from such line would be extinguished. When the gas pressure has again been turned on, the rod 11 is raised to effect an opening of the valve, the pressure within the line serving to hold the valve open.

An important feature of this invention consists in the total absence of springs, levers and other devices which have been used in valves of this character to effect a closing of the valve upon a shutting off of the pressure within the line, thus rendering our valve more positive and certain in its action, as no parts, which might become rusted or bound in stationary position by reason of long standing in one position, are present therein to prevent a closing of the valve upon a shutting off of the gas line pressure.

We wish it understood that our invention is not limited to any specific construction or arrangement of the parts except in so far as such limitations are specified in the claim.

Having thus described our invention, what we claim as new and desire to secure by Letters Patent, is,—

In a safety valve, a casing having an inlet and an outlet disposed so that the top of the outlet alines with the bottom of the inlet, a downwardly dished conical valve seat between said inlet and outlet disposed so that its top is in alinement with the inlet bottom and its bottom projects down into the outlet, an upwardly dished conical valve seat located above the first named valve seat and having an opening in its apex, a valve of double conical form having its bottom for engagement with said first named seat and its top for engagement with the second named seat, a stem carried by the valve and extending through the opening of the second named valve seat, a head on said stem, a cap on the casing, and a rod extending through the cap and having its lower end connected to the valve stem and normally resting on and supported by the apex of the upwardly dished valve seat.

In testimony whereof, we have hereunto signed our names to this specification in the presence of two subscribing witnesses.

EMIL A. RADUNZ.
OTTO ENGELHARDT.

Witnesses:
C. W. OWEN,
C. H. BILLS.

---

Copies of this patent may be obtained for five cents each, by addressing the "Commissioner of Patents, Washington, D. C."